(12) United States Patent
Okumura

(10) Patent No.: US 6,469,754 B1
(45) Date of Patent: Oct. 22, 2002

(54) LIQUID-CRYSTAL DISPLAY WITH SCANNER

(75) Inventor: Fujio Okumura, Tokyo (JP)

(73) Assignee: NEC Corporation (JP)

( * ) Notice: Subject to any disclaimer, the term of this patent is extended or adjusted under 35 U.S.C. 154(b) by 136 days.

(21) Appl. No.: 09/654,624

(22) Filed: Sep. 5, 2000

(30) Foreign Application Priority Data

Sep. 7, 1999 (JP) .............................................. 11-253484

(51) Int. Cl.⁷ .............................................. G02F 1/1335
(52) U.S. Cl. ................................................. 349/2; 349/3
(58) Field of Search ............................ 349/2, 3, 64, 112

(56) References Cited

U.S. PATENT DOCUMENTS 6,141,065 A * 10/2000 Furuki et al. ................... 349/2

FOREIGN PATENT DOCUMENTS

| JP | 3-255772 | 11/1991 | ............ H04N/1/04 |
| JP | 4-211558 | 8/1992 | ............ H04N/1/024 |
| JP | 5-100645 | 4/1993 | ............ G09G/5/00 |
| JP | 5-260252 | 10/1993 | ............ H04N/1/04 |
| JP | 6-276363 | 9/1994 | ............ H04N/1/04 |
| JP | 6-291935 | 10/1994 | ............ H04N/1/028 |
| JP | 10-173861 | 6/1998 | ............ H04N/1/028 |

* cited by examiner

Primary Examiner—J. Dudek
(74) Attorney, Agent, or Firm—Hayes Soloway P.C.

(57) ABSTRACT

A liquid-crystal display apparatus with a scanner comprising: a liquid-crystal panel 3 used for display, an image sensor 5 used to read an image on a manuscript 10, a light source 1 illuminating the liquid-crystal panel 3 and the manuscript 10, and a diffusion plate 2 to diffuse light from the light source 1, disposed on a front side or a rear side of the liquid-crystal panel 3 so as to overlap with the liquid-crystal panel 3, wherein the image sensor 5 having a one-dimensional sensor element 107 with a light-guiding hole 120 for passing light from the light source 1 to a photosensitive layer 117, and a fiber array plate 111 provided in contact with the one-dimensional image sensor 107, the light source 1 and the image sensor 5 being disposed at an edge portion of the diffusion plate 2 so as to sandwich the diffusion plate 2.

10 Claims, 10 Drawing Sheets

Fig. 4
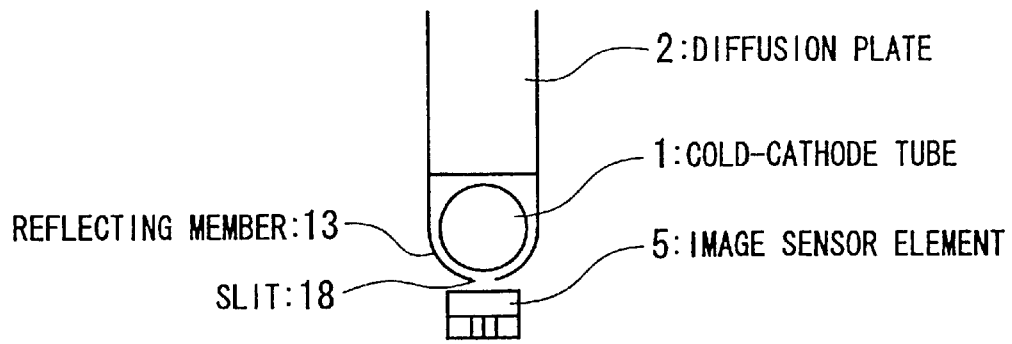
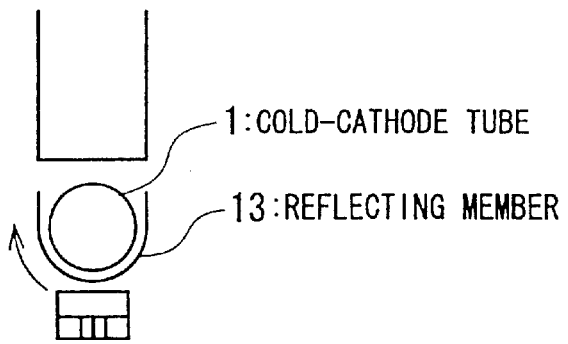
Fig. 5 (a)
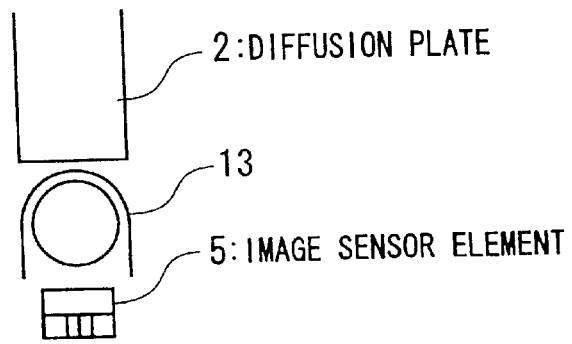
Fig. 5 (b)

Fig. 8
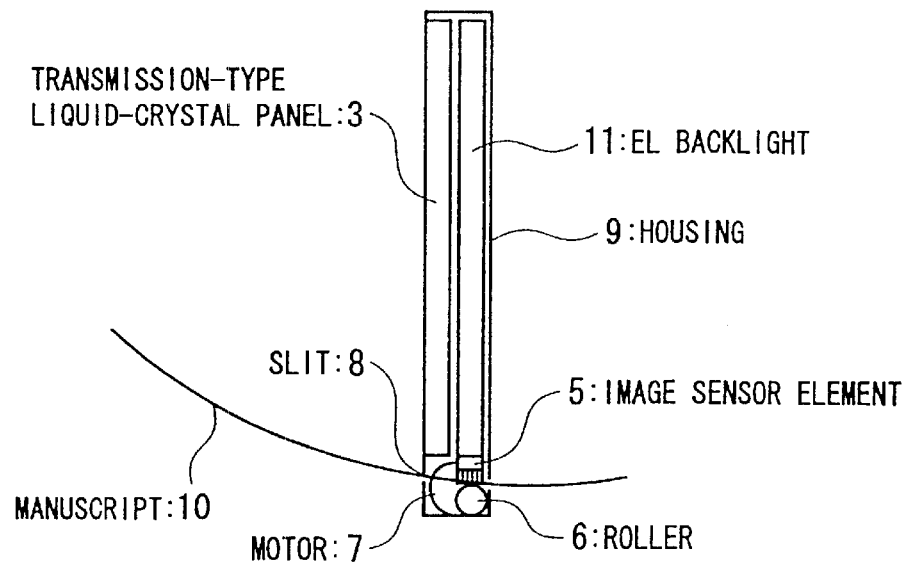
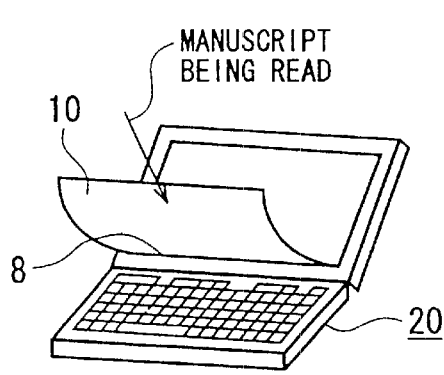
Fig. 9 (a)
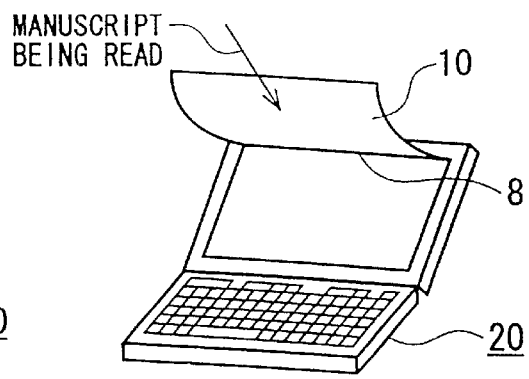
Fig. 9 (b)
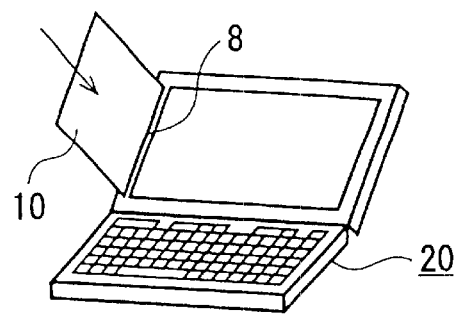
Fig. 9 (c)
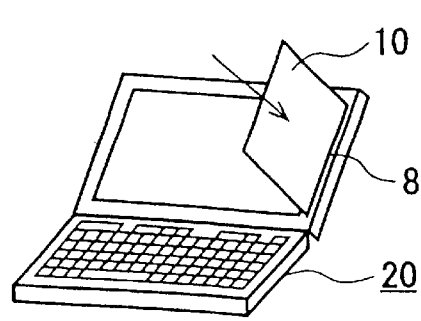
Fig. 9 (d)

Fig. 17
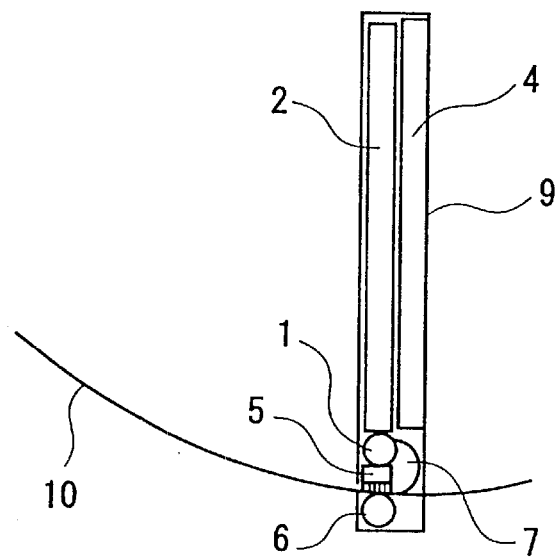
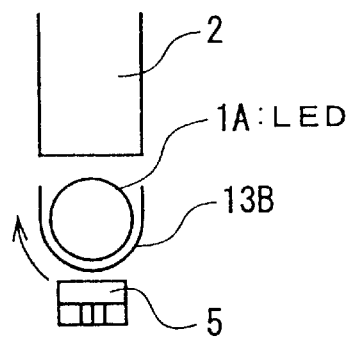
Fig. 18(a)
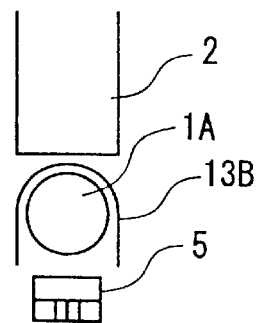
Fig. 18(b)

LIQUID-CRYSTAL DISPLAY WITH SCANNER

BACKGROUND OF THE INVENTION

1. Field of the Invention

The present invention relates to a liquid-crystal display with a scanner, and more particularly to a liquid-crystal display with a scanner, which enables the achievement of a built-in scanner module that does not sacrifice the thinness of the liquid-crystal module.

2. Related Art

In a conventional liquid-crystal display with scanner, it was necessary to provide an LED light source for illumination of the manuscript, and an electroluminescent (EL) light source for use as a backlight for the LCD separately, thereby leading to an increase in the overall cost of the apparatus. With respect to this problem, as shown in FIG. 13, a scanner device which is disclosed in Japanese Unexamined Patent Publication (KOKAI) No. 3-255772, was proposed. In this scanner device, it was not necessary to provide a backlight for the display and a light source for the manuscript separately.

In the above-mentioned scanner device, as shown in FIG. 13, light which is emitted from the fluorescent tube 45 illuminates the reading point on the manuscript, this manuscript being read by an image sensor 47, via a selfoc lens array 46. Part of the scattered light from the fluorescent tube 45 is guided to the bottom part of the LCD 42 by the light-blocking member 49, and the reflector 48, thereby providing uniformed illumination over the entire lower surface of the LCD 42. That is, part of the light of the fluorescent tube 45 that illuminates the surface of the manuscript 43 is reflected by the reflector 48, and guided to the lower surface of the LCD 42, thereby acting as a backlight. By doing this, it is possible to utilize the fluorescent tube 45 as both illumination of manuscript 43 and a backlight for the LCD 42.

In an image scanner that reads an image on a manuscript, and particularly in a hand-held scanner of the past, LCDs were often used as the display device, and when this was a reflective type LCD, it was difficult to read on a display in dark locations, so that to make the display readable, a backlight was used. However, this increased the number of parts, and made the device uneconomical. With regard to this problem, the device as shown in FIG. 14 was developed. This device is disclosed in Japanese Unexamined Patent Publication (KOKAI) No. 5-260252. According to the image scanner which is shown in FIG. 14, light from a lamp (light source) 56 is collected by a lamp holder 57, the part of the collected light being introduced to a light guide member 59, via a cutout (light-guiding part) 57a, thereby illumination being made from the rear of the liquid-crystal display 60, so that a bright display is obtained on the liquid-crystal display 60, making the displayed image easy to view.

According to this type of image scanner 70, a light guide 59 is provided at the bottom side of the liquid-crystal display 60, part of the light from the light source 56 illuminating of the manuscript 71 being guided to within a light guide member 59, so that it is possible to illuminate the liquid-crystal display 60 without providing a separate illumination light source, thereby obtaining an easy-to-view display.

Another technology of the past can be described simply as follows.

In Japanese Unexamined Patent Publication (KOKAI) No. 4-211558, there is disclosure of image information input/output device used in a facsimile apparatus or the like, and in particular an image information input/output device that enables integration of an image information reading apparatus and an image information writing apparatus. In this type of input/output device of the past, because an image information input section and output section are provided on the same substrate, there is no commonality between the drive circuitry for the light receiving elements, and the light guide means, so that the configuration is insufficient in terms of compactness, ease of manufacturing, and cost reduction. This device comprises a light-receiving element that receives light from a light source, a substrate which supports a light-emitting element that illuminates a photosensitive body, a first drive circuit for the light-receiving element, a second drive circuit for the light-emitting element, a first light-collecting fiber array that guides light of the light source, and a second light-collecting fiber array that guides the light of the light-emitting element, at least one pair of light-receiving and light-emitting elements being disposed next to one another, so that at least one of the first and second light-collecting fiber arrays or first and second drive circuits are shared.

In Japanese Unexamined Patent Publication (KOKAI) No. 5-100645, there is disclosure of an integrated external information read-in/display apparatus for displaying information that is captured by a scanner, an image input means, or an audio input means or the like, on a display device such a flat-panel display. This information processing apparatus has a configuration in which a front display part and a rear scanner part are integrated as one, thereby achieving compactness, thinness, and light weight. Scanned information from the scanner part can be displayed on the display, and in certain cases, external image information or audio information can also be displayed on the display part.

In Japanese Unexamined Patent Publication (KOKAI) No. 6-276363, there is disclosure of a manuscript read-in apparatus capable of use in such equipment as a facsimile apparatus, a copying machine, or a scanner or the like. In particular, this invention minimizes the number of components, and features a simple construction and low costs, while facilitating the adjustment procedure and facilitating work burden when implementing units. Particularly, in this manuscript read-in apparatus, the sensor array having a plurality of opto-electrical conversion elements is housed within a fluorescent display tube.

As shown in FIG. 15, an image sensor disclosed in Japanese Unexamined Patent Publication (KOKAI) No. 6-291935 is proposed. This image sensor comprises an LED array 101 which radiates illumination light 105, an image sensor substrate 102 onto which is formed a sensor element 107 having a light-guiding hole 120 shown in FIG. 2 that passes the illumination light 105 within the light-receiving surface to a manuscript 104, and a fiber array plate (FAP) 111 formed by fibers 112 that guide incident light from one surface to the other surface, these elements being disposed in the sequence corresponding to the direction of radiation of the illumination light 105. Illumination light 105 from the LED array 101 passes through the light-guiding hole 120 provided at the sensor element 107, and strikes the fibers 112, whereupon it is guided to the surface of the manuscript 104, the signal light 106 which is reflected at the surface of the manuscript 104 being guided to the photosensitive layer 117 of the sensor element 107 by the fibers 112, at which it is opto-electrically converted (refer to FIG. 2 and FIG. 15).

The image sensor disclosed in Japanese Unexamined Patent Publication (KOKAI) No. 10-173861, shown in FIG. 16, is one in which a large number of sensor elements are arranged with the same width as the manuscript, and a contact-type color sensor elements read in the images on the manuscript in intimate contact therewith.

As shown in FIG. 16, this color image sensor has the following configuration. Specifically, electrodes 218 are provided on one surface of a glass substrate 215. On the electrodes 218, a photosensitive layer 217, common electrode 216, and a color filter 219 are successively laminated, these elements being protected by a protective layer 209, thereby forming the sensor substrate 210. The light guide 212 is adhered to the protective film 209, with an adhesive layer 208 therebetween. On the glass substrate 215 side of the sensor substrate 210, a color LED array light source 202 is disposed. Light from the color LED array light source 202 is guided to the light guide 212 via the light-guide hole 207, and illuminates the manuscript 205. Light reflected on the manuscript 205 reverses direction, passing through the color filter 219, and reaches the photosensitive layer 217.

The thickness of a display used in currently available notebook type personal computers is about 4 to 5 mm. However, because of using a selfoc lens, it is not possible to achieve a short distance between the manuscript and the sensor, thereby resulting in a configuration in which the sensor part alone protrudes, this being unwieldy and unattractive from the standpoint of design.

Accordingly, it is an object of the present invention to solve the problems indicated in the above-noted drawbacks in the prior art, and obtain a compact, thin and light liquid-crystal display with a scanner that does not sacrifice the thinness of the liquid-crystal module.

SUMMARY OF THE INVENTION

To achieve the above-noted object the present invention has the following basic technical constitution.

Specifically, the first aspect of the present invention is a liquid-crystal display apparatus with a scanner comprising: a liquid-crystal panel used for display, an image sensor used to read an image on a manuscript, a light source illuminating the liquid-crystal panel and the manuscript, and a diffusion plate to diffuse light from the light source, disposed on a front side or a rear side of the liquid-crystal panel so as to overlap with the liquid-crystal panel, wherein the image sensor having a one-dimensional image sensor element with a light-guiding hole for passing light from the light source to a photosensitive layer, and a fiber array plate provided in contact with the one-dimensional image sensor, the light source and the image sensor being disposed at an edge portion of the diffusion plate so as to sandwich the diffusion plate.

The second aspect of the present invention is a liquid-crystal display apparatus with a scanner comprising: a liquid-crystal panel used for display, an image sensor used to read an image on a manuscript, a light source illuminating the liquid-crystal panel and the manuscript, and a diffusion plate to diffuse light from the light source, disposed on a front side or a rear side of the liquid-crystal panel so as to overlap with the liquid-crystal panel, wherein the image sensor having a one-dimensional image sensor element with a light-guiding hole for passing light from the light source to a photosensitive layer, and a fiber array plate provided in contact with the one-dimensional image sensor, the light source being disposed at an edge portion of the diffusion plate so as to be sandwiched between the diffusion plate and the image sensor.

In a third aspect of the present invention, a reflecting member is provided between the light source and the image sensor so as to guide light from the light source to the diffusion plate, the reflecting member being provided with a slit for illuminating the manuscript.

In a fourth aspect of the present invention, a reflecting member is provided between the light source and the image sensor so as to guide light from the light source to the diffusion plate and the manuscript selectively, the reflecting member is controlled so as to be positioned at a first position by a control means when the light source illuminates the liquid-crystal panel, and the reflecting member is controlled so as to be positioned at a second position by the control means when the light source illuminates the manuscript.

A fifth aspect of the present invention is a liquid-crystal display apparatus with a scanner comprising: a liquid-crystal panel used for display, an image sensor used to read an image on a manuscript, a light source illuminating the liquid-crystal panel and the manuscript, and a diffusion plate to diffuse light from the light source, disposed on a front side or a rear side of the liquid-crystal panel so as to overlap with the liquid-crystal panel, wherein the image sensor having a one-dimensional image sensor element with a light-guiding hole for passing light from the light source to a photosensitive layer, and a fiber array plate provided in contact with the one-dimensional image sensor, the light source being disposed at a first edge portion of the diffusion plate, the image sensor being disposed at a second edge portion of the diffusion plate, and the light source and the image sensor are positioned so as to be perpendicular to one another.

In a sixth aspect of the present invention, the liquid-crystal panel is a transmission-type liquid-crystal panel.

In a seventh aspect of the present invention, the liquid-crystal panel is a reflective-type liquid-crystal panel.

The eight aspect of the present invention is a liquid-crystal display apparatus with a scanner comprising: a liquid-crystal panel used for display, an image sensor used to read an image on a manuscript, and a light source illuminating the liquid-crystal panel and the manuscript, wherein the image sensor having a one-dimensional image sensor element with a light-guiding hole for passing light from the light source to a photosensitive layer, and a fiber array plate provided in contact with the one-dimensional image sensor, the light source is an electroluminescent (EL) type light source and the electroluminescent (EL) type light source is disposed on a rear side of the liquid-crystal panel so as to overlay with the liquid-crystal panel.

BRIEF DESCRIPTION OF THE DRAWINGS

FIG. 4 is a drawing illustrating a third embodiment of the present invention.

FIG. 5(a) and FIG. 5(b) are drawings illustrating a fourth embodiment of the present invention.

FIG. 8 is a drawing illustrating a seventh embodiment of the present invention.

FIG. 9(a) to FIG. 9(d) are drawings illustrating application of an image sensor element to a notebook type personal computer.

FIG. 17 is a drawing illustrating an eighth embodiment of the present invention.

FIG. 18(a) and FIG. 18(b) are drawings illustrating a ninth embodiment of the present invention.

DETAILED DESCRIPTION OF THE PREFERRED EMBODIMENTS

Preferred embodiments of a liquid crystal display with a scanner according to the present invention are described in detail below, with references made to relevant accompanying drawings.

(First Embodiment)

Figure 1:
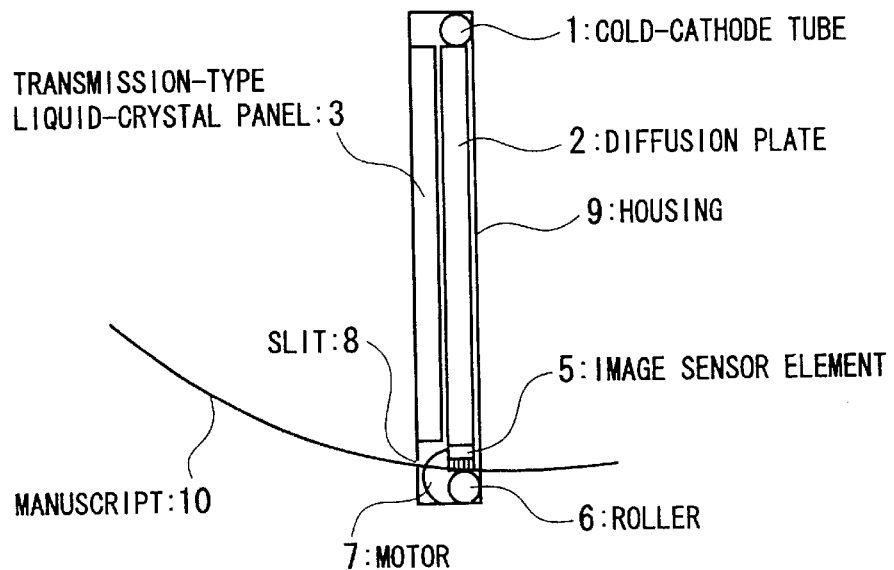
FIG. 1 is a drawing illustrating a first embodiment of the present invention using a transmission-type liquid crystal panel.
Figure 2:
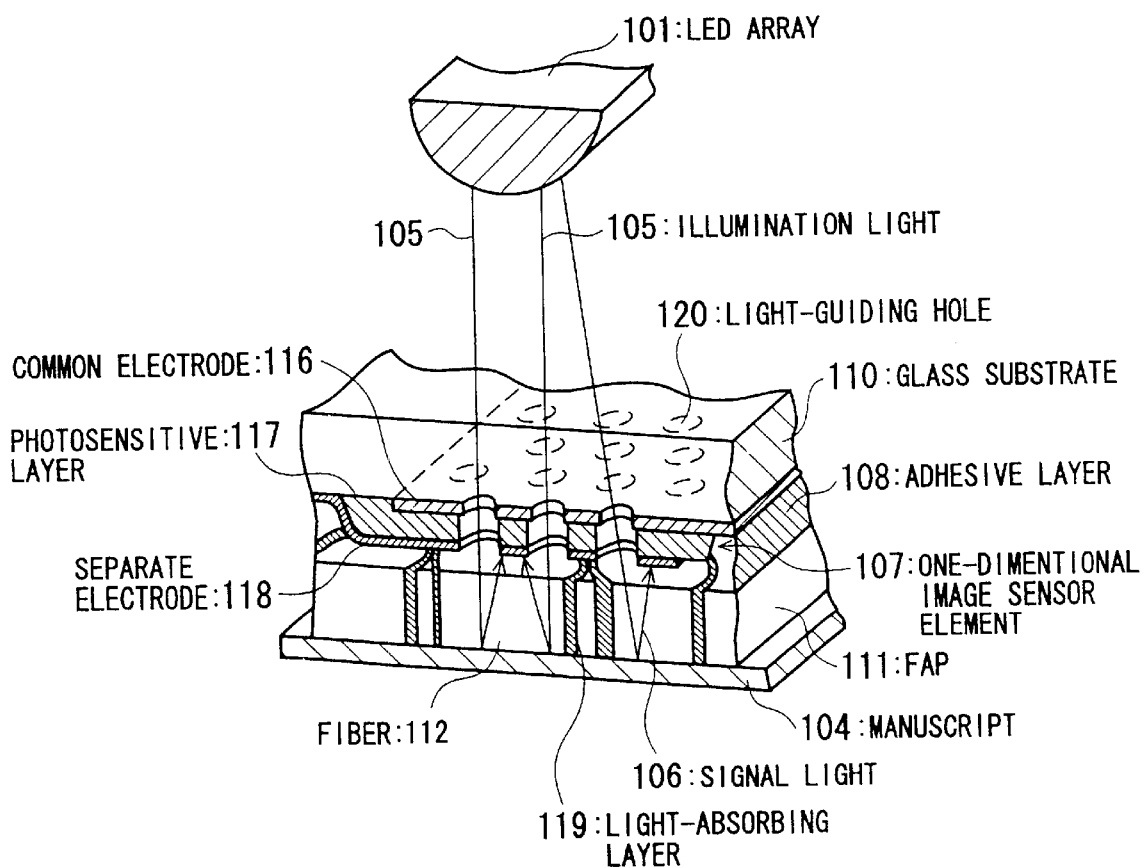
FIG. 2 is perspective view showing the basic configuration of an image sensor element.
Figure 15:
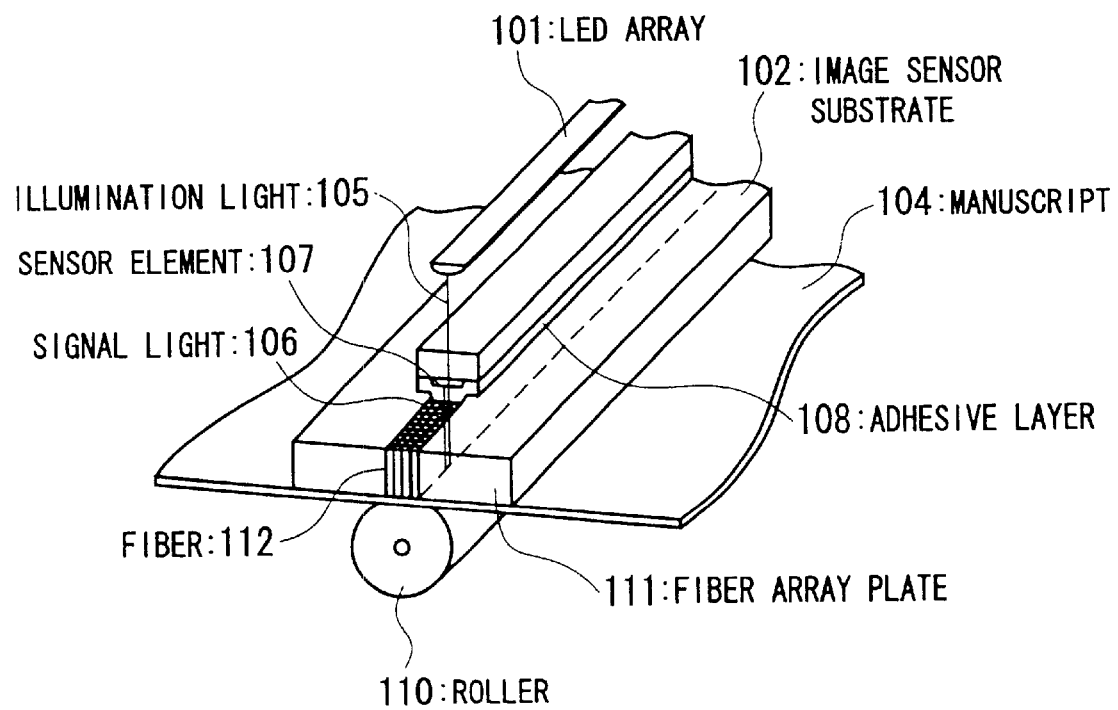
FIG. 15 is a perspective view of an image sensor of the prior art.
Figure 16:
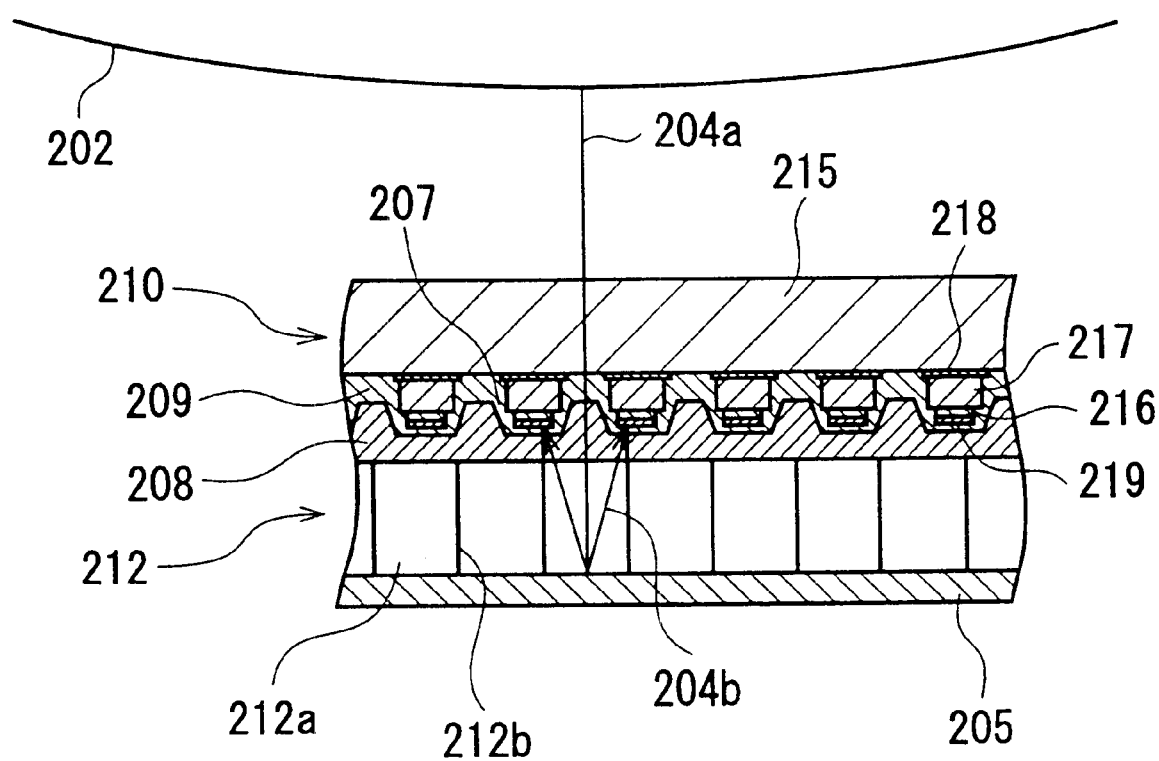
FIG. 16 is a cross-sectional view showing the color image sensor of the prior art.

FIG. 1 shows a first embodiment of the present invention, and FIG. 2 and FIG. 15 are perspective views of the basic configuration of the image sensor element thereof.

The image sensor element used in the present invention is formed, as shown in FIG. 2, by a common electrode 116, a photosensitive layer 117, and an electrode 118, thereby forming a photosensitive part having a light-guiding hole 120.

A liquid crystal display with a scanner according to the present invention has an image sensor that is formed by a one-dimensional image sensor element 107 having a photosensitive part with a light-guiding hole 120 such as described above, a fiber array plate (FAP) 111 provided so as to be in contact with a surface of the image sensor element 107, and a light source 101, combined with a liquid crystal display panel having a light source that is used for both illumination of a manuscript and a backlight for the LCD display. In FIG. 1, a liquid crystal display with a scanner according to the present invention comprises a cold-cathode tube 1, a diffusion member 2, and transmission-type liquid crystal panel 3, an image sensor element 5, a roller 6, and a motor 7 to drive the roller 6, these being provided in a housing 9 with a slit 8. When reading colored image with the image sensor 5, a color filter which is disclosed in the Japanese Unexamined Patent Publication (KOKAI) No.10-173861, is provided for each pixel.

In general, a liquid crystal panel is formed by two glass substrates, a liquid crystal provided between these two glass substrates, and polarizers affixed to surfaces of these two glass substrates, and a drive IC or the like provided in the periphery of a liquid crystal panel. This panel is combined with a backlight, signal processing circuitry, power supply circuitry, and a frame or the like, to form the completed liquid crystal module.

In the present invention, because the scanner is disposed at the edge part of the display, it is possible to obtain a LCD display apparatus with a built-in scanner, without the sacrificing the thinness of the liquid crystal module. In an image scanner of the present invention comprising a one-dimensional image sensor element 5 having a photosensitive section with a light-guiding hole 120, and a fiber array plate (FAP) provided so as to be in contact with the surface of this image sensor element, the light source 1 is disposed above the image sensor 5 as shown in FIG. 1. In the example of FIG. 1, light from the cold-cathode tube 1 is used to uniformly illuminate the transmission-type liquid crystal panel 3, by means of the diffusion member 2, and the image sensor element 5 disposed at an edge portion of the diffusion member 2 receives part of the light from the cold-cathode tube 1. It is therefore easy to arrange the light source 1, image sensor element 5, and FAP in a single straight line, so that the overall thickness of the liquid crystal display according to the present invention is very thin.

As described above, a liquid-crystal display apparatus with a scanner according to the present invention comprising: a liquid-crystal panel 3 used for display, an image sensor 5 used to read an image on a manuscript 10, a light source 1 illuminating the liquid-crystal panel 3 and the manuscript 10, and a diffusion plate 2 to diffuse light from the light source 1, provided on a front side or a rear side of the liquid-crystal panel 3 so as to overlap with the liquid-crystal panel 3, wherein the image sensor 5 having a one-dimensional sensor element 107 with a light-guiding hole 120 for passing light from the light source 1 to a photosensitive layer 117, and a fiber array plate 111 provided in contact with the one-dimensional image sensor 107, the light source 1 and the image sensor 5 being disposed at an edge part of the diffusion plate 2 so as to sandwich the diffusion plate 2.

(Second Embodiment)

Figure 3:
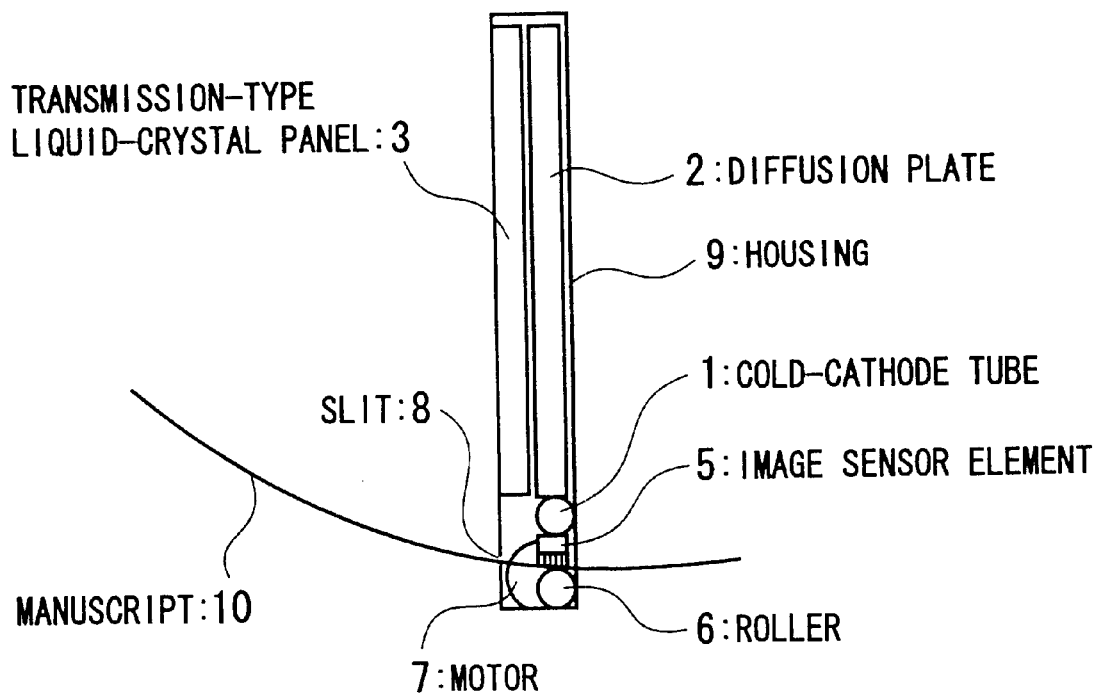
FIG. 3 is a drawing illustrating a second embodiment of the present invention.

In edge-lighting, a fluorescent tube is disposed at the edge portion of a light-guiding plate or a diffusion plate and light from the fluorescent tube is caused to enter the light-guiding plate from this edge, this light being uniformly diffused within the plate, so as to enable use as a surface light source for backlighting of a liquid crystal. FIG. 3 shows an edge-lighting of the present invention. As shown in FIG. 3, an image sensor element 5 is disposed in proximity to a cold-cathode tube light source 1, and part of the light from the cold-cathode 1 is supplied to the image sensor element 5.

As described above, a liquid-crystal display apparatus with a scanner according to the present invention comprising: a liquid-crystal panel 3 used for display, an image sensor used to read an image on a manuscript 10, a light source 1 illuminating the liquid-crystal panel 3 and the manuscript 10, a diffusion plate 2 to diffuse light from the light source 1, provided on a front side or a rear side of the liquid-crystal panel 3 so as to overlap with the liquidcrystal panel 3, wherein the image sensor 5 having a one-dimensional sensor element 107 with a light-guiding hole 120 for passing light from the light source 1 to a photosensitive layer 117, and a fiber array plate 111 provided in contact with the one-dimensional image sensor 107, the light source 1 being disposed at an edge part of the diffusion plate 2 so as to be sandwiched between the diffusion plate 2 and the image sensor 5.

(Third Embodiment)

FIG. 4 shows a third embodiment of the present invention. In this embodiment, in order to efficiently guide light from the cold-cathode tube 1 to the diffusion plate 2, the reflecting member 13 is disposed between the cold-cathode tube 1 and image sensor 5. This reflecting member 13 provided with a slit 8 so as to supply light from the cold-cathode tube 1 to the image sensor element 5.

(Fourth Embodiment)

FIG. 5 shows a fourth embodiment of the present invention. In this embodiment, in order to efficiently guide light from the cold-cathode tube 1 to the diffusion plate 2 and a image sensor 5, the reflecting member 13 is disposed between the cold-cathode tube 1 and image sensor 5. As shown in FIG. 5(a), this reflecting member 13 is controlled so as to be positioned at a first position by a control means 80 when the light source 1 illuminates the liquid-crystal panel 3, and as shown in FIG. 5(b), the reflecting member 13 is controlled so as to be positioned at a second position by the control means 80 when the light source 1 illuminates the manuscript 10.

(Fifth Embodiment)

Figure 6:
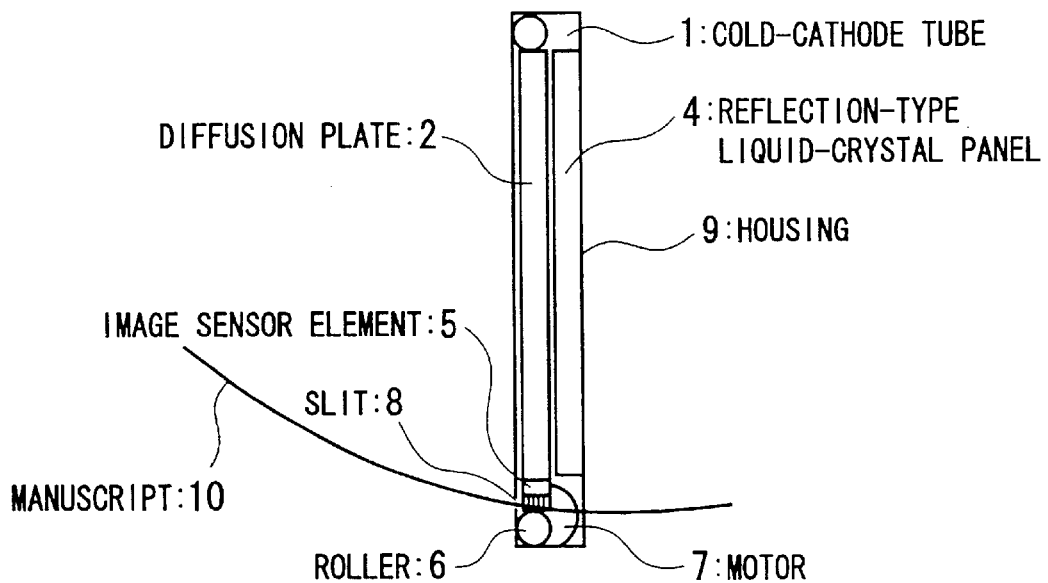
FIG. 6 is a drawing showing a fifth embodiment of the present invention.

FIG. 6 shows an embodiment as applied to a reflective-type liquid crystal panel. In this type of reflective-liquid crystal panel as well, frontlighting illumination, which assumes use in a dark location is employed. In this configuration, the positional relationship of the liquid crystal panel 4 and the diffusion plate 2 are exactly opposite that of the first embodiment, in which case it is possible to share the light source as shown in FIG. 6.

(Sixth Embodiment)

Figure 7:
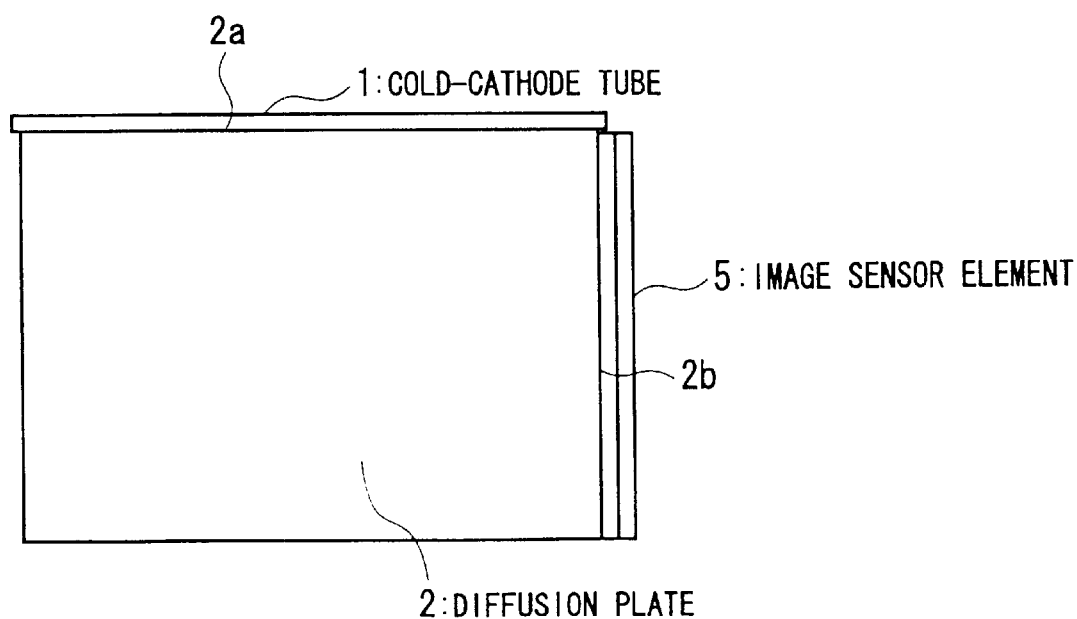
FIG. 7 is a drawing showing a sixth embodiment of the present invention.

The foregoing embodiments are examples in which the cold-cathode tube and image sensor sandwich the diffusion sheet 2. In contrast to this, as shown in FIG. 7, it is possible to have a configuration in which the cold-cathode tube and the image sensor are positioned so as to be perpendicular one another.

As described above, a liquid-crystal display apparatus with a scanner according to the present invention comprising: a liquid-crystal panel 3 used for display, an image sensor 5 used to read an image on a manuscript 10, a light source 1 illuminating the liquid-crystal panel 3 and the manuscript 10, and a diffusion plate 2 to diffuse light from the light source 1, provided on a front side or a rear side of the liquid-crystal panel 3 so as to overlap with the liquid-crystal panel 3, wherein the image sensor 5 having a one-dimensional sensor element 107 with a light-guiding hole 120 for passing light from the light source 1 to a photosensitive layer 117, and a fiber array plate 111 provided in contact with the one-dimensional image sensor 107, the light source 1 being disposed at a first edge portion 2a of the diffusion plate 2, the image sensor 5 being disposed at a second edge portion 2b of the diffusion plate 2, and the light source 1 and the image sensor 5 are positioned so as to be perpendicular one another.

(Seventh Embodiment)

FIG. 8 shows a seventh embodiment of the present invention. In this embodiment, the light source for illuminating the liquid-crystal display panel 3 and the image sensor element 5 is an electroluminescent (EL) panel.

The above-mentioned electroluminescent (EL) panel 11 is disposed on a rear side of the liquid-crystal panel 3 so as to overlap with this liquid-crystal panel 3.

(Eighth Embodiment)

FIG. 17 shows an another embodiment that is applied to a reflective-type liquid crystal panel 2. In this configuration, light source 1 is disposed at an edge portion of the diffusion plate 2 and sandwiched between the diffusion plate 2 and the image sensor 5.

(Ninth Embodiment)

In the present invention, a LED (Light Emitting Diode) 1A can be used in place of the cold-cathode tube 1 as mentioned above. Since a light emitting from the LED 1A has directivity, in order to efficiently guide light from the LED 1A to the diffusion plate 2 or the image sensor element 5, the reflecting member 13B is disposed between the LED 1 and image sensor 5, and controlled as shown in FIG. 18(a) and FIG. 18(b).

FIG. 9 shows an example of application to a notebook type personal computer. The position of the image sensor can be established at any side of the LCD display screen, so that when the present invention is applied to a notebook-type personal computer, it is possible to place the manuscript insertion port 8 at any side of the liquid crystal display panel.

Figure 10A:
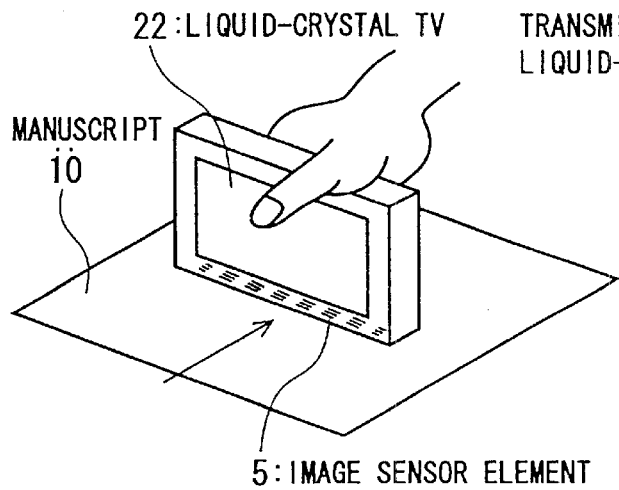
FIGS. 10(a) and 10(b) are drawings illustrating application to a hand-held scanner.
Figure 10B:
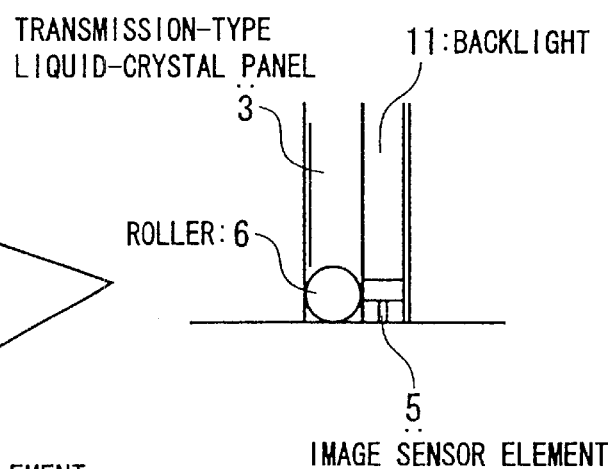

FIGS. 10(a) and 10(b) shows an example of application of the present invention to a portable hand-held scanner having a liquid crystal TV screen or display. In this case, reading is done by manually tracing the manuscript with this scanner. The difference between this scanner and FIG. 1 is that the motor is not necessary, because manual scanning is done. In place of the motor, an encoder (not shown in the drawing) is necessary to measure the reading position.

Figure 11:
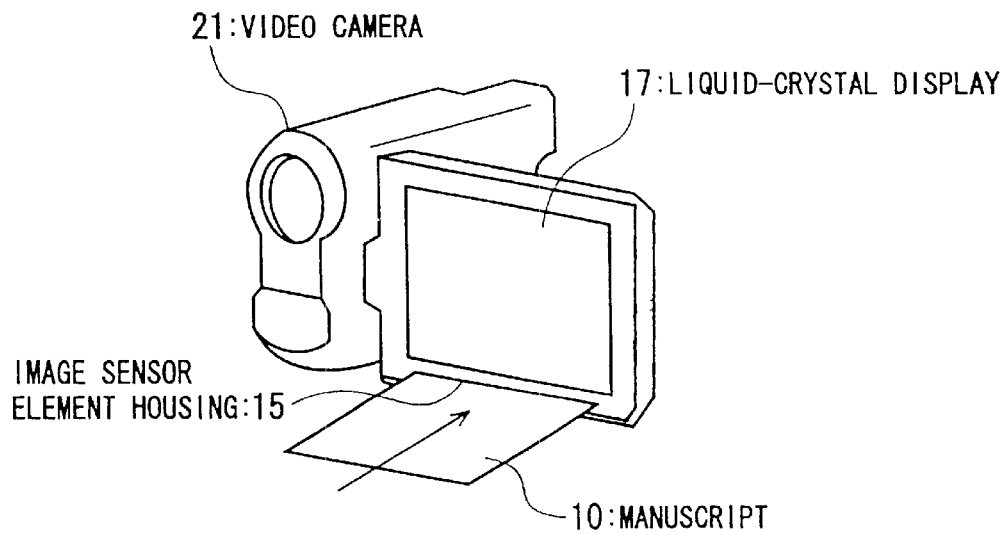
FIG. 11 is a drawing showing application to a video camera.

FIG. 11 shows an example in which the present invention is applied to a display having a video camera.

Figure 12:
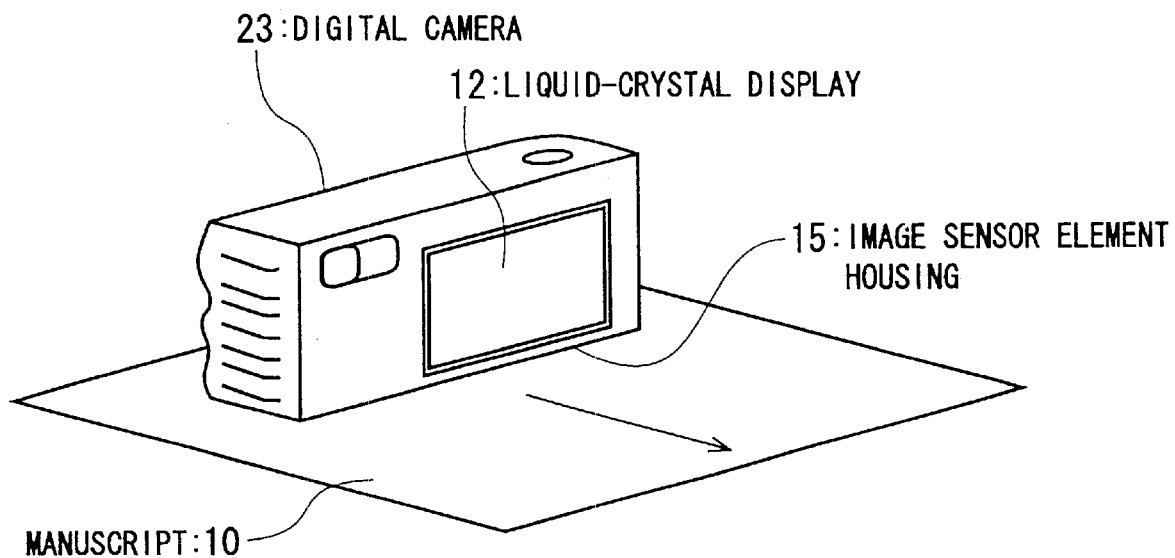
FIG. 12 is a drawing showing application to a digital camera.
Figure 13:
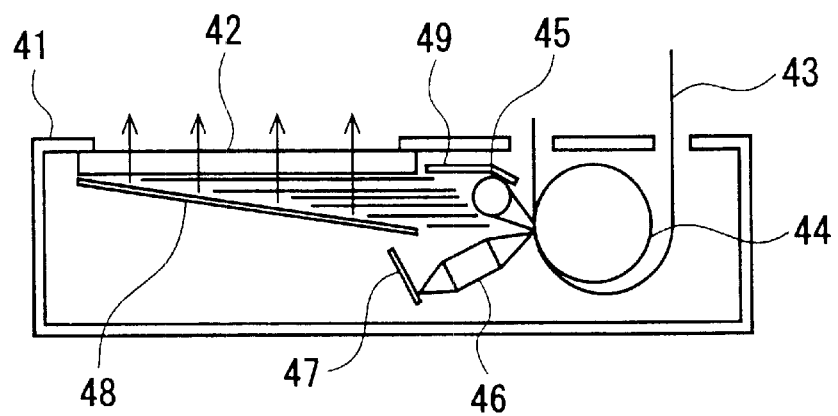
FIG. 13 is a cross-section view showing the conventional scanner.
Figure 14:
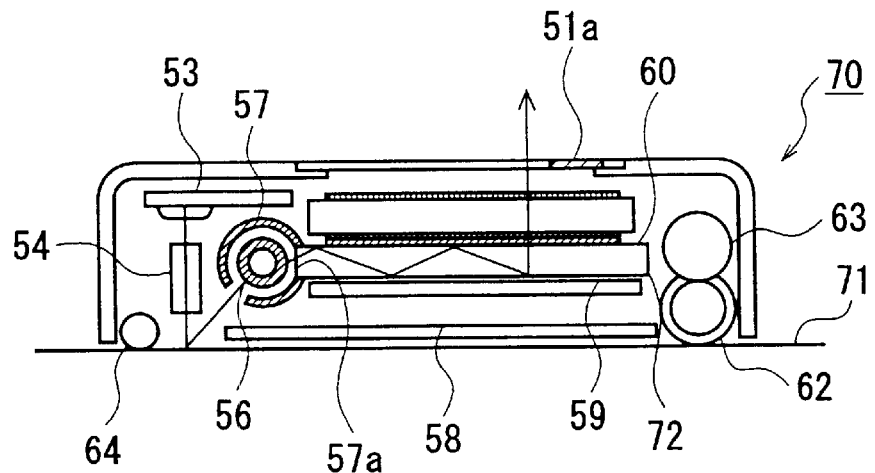
FIG. 14 is a cross-section view showing the another conventional scanner.

FIG. 12 shows an example of the present invention applied to a liquid crystal display of a digital camera.

By adopting the constitution as described above, it is possible to obtain thin and compact liquid-crystal display apparatus having a built-in scanner.

What is claimed is:

1. A liquid-crystal display apparatus with a scanner comprising:

a liquid-crystal panel used for display, an image sensor used to read an image on a manuscript, a light source illuminating said liquid-crystal panel and said manuscript, and a diffusion plate to diffuse light from said light source, disposed on a front side or a rear side of said liquid-crystal panel so as to overlap with said liquid-crystal panel, wherein said image sensor having a one-dimensional image sensor element with a light-guiding hole for passing light from said light source to a photosensitive layer, and a fiber array plate provided in contact with said one-dimensional image sensor, said light source and said image sensor being disposed at an edge portion of said diffusion plate so as to sandwich said diffusion plate.

2. A liquid-crystal display apparatus with a scanner comprising:

a liquid-crystal panel used for display, an image sensor used to read an image on a manuscript, a light source illuminating said liquid-crystal panel and said manuscript, and a diffusion plate to diffuse light from said light source, disposed on a front side or a rear side of said liquid-crystal panel so as to overlap with said liquid-crystal panel, wherein said image sensor having a one-dimensional image sensor element with a light-guiding hole for passing light from said light source to a photosensitive layer, and a fiber array plate provided in contact with said one-dimensional image sensor, said light source being disposed at an edge portion of said diffusion plate so as to be sandwiched between said diffusion plate and said image sensor.

3. A liquid-crystal display apparatus with a scanner according to claim 2, wherein a reflecting member is provided between said light source and said image sensor so as to guide light from said light source to said diffusion plate, said reflecting member being provided with a slit for illuminating said manuscript.

4. A liquid-crystal display apparatus with a scanner according to claim 2, wherein a reflecting member is provided between said light source and said image sensor so as to guide light from said light source to said diffusion plate and said manuscript selectively, said reflecting member is controlled so as to be positioned at a first position by a control means when said light source illuminates said liquid-crystal panel, and said reflecting member is controlled so as to be positioned at a second position by said control means when said light source illuminates said manuscript.

5. A liquid-crystal display apparatus with a scanner comprising:

a liquid-crystal panel used for display, an image sensor used to read an image on a manuscript, a light source illuminating said liquid-crystal panel and said manuscript, and a diffusion plate to diffuse light from said light source, disposed on a front side or a rear side of said liquid-crystal panel so as to overlap with said liquid-crystal panel, wherein said image sensor having a one-dimensional image sensor element with a light-guiding hole for passing light from said light source to a photosensitive layer, and a fiber array plate provided in contact with said one-dimensional image sensor, said light source being disposed at a first edge portion of said diffusion plate, said image sensor being disposed at a second edge portion of said diffusion plate, and said light source and said image sensor are positioned so as to be perpendicular to one another.

6. A liquid-crystal display apparatus with a scanner according to claim 1, wherein said liquid-crystal panel is a transmission-type liquid-crystal panel.

7. A liquid-crystal display apparatus with a scanner according to claim 1, wherein said liquid-crystal panel is a reflective-type liquid-crystal panel.

8. A liquid-crystal display apparatus with a scanner according to claim 1, wherein said light source is cold-cathode tube.

9. A liquid-crystal display apparatus with a scanner according to claim 1, wherein said light source is a LED.

10. A liquid-crystal display apparatus with a scanner comprising:

a liquid-crystal panel used for display, an image sensor used to read an image on a manuscript, and a light source illuminating said liquid-crystal panel and said manuscript, wherein said image sensor having a one-dimensional image sensor element with a light-guiding hole for passing light from said light source to a photosensitive layer, and a fiber array plate provided in contact with said one-dimensional image sensor, said light source is an electroluminescent (EL) type light source and said electroluminescent (EL) type light source is disposed on a rear side of said liquid-crystal panel so as to overlap with said liquid-crystal panel.

* * * * *

UNITED STATES PATENT AND TRADEMARK OFFICE
CERTIFICATE OF CORRECTION

| | | |
|---|---|---|
| PATENT NO. | : 6,469,754 B1 | Page 1 of 1 |
| APPLICATION NO. | : 09/654624 | |
| DATED | : October 22, 2002 | |
| INVENTOR(S) | : Fujio Okumura | |

It is certified that error appears in the above-identified patent and that said Letters Patent is hereby corrected as shown below:

Title Page

Under REFERENCES CITED at (56):

Add the following references:
  JP02-308665
  JP09-083728

Signed and Sealed this

Twenty-third Day of August, 2011

David J. Kappos
*Director of the United States Patent and Trademark Office*